United States Patent [19]

Francis, Jr. et al.

[11] 4,154,447
[45] May 15, 1979

[54] LABYRINTH SEAL FOR TROLLEY WHEELS OR THE LIKE

[75] Inventors: George W. Francis, Jr.; Gerald M. Stankiewicz, both of Saginaw, Mich.

[73] Assignee: Saginaw Products Corporation, Saginaw, Mich.

[21] Appl. No.: 907,734

[22] Filed: May 19, 1978

[51] Int. Cl.² .................... F16C 33/80; F16J 15/44
[52] U.S. Cl. ...................................... 277/24; 277/25; 277/57; 277/133; 308/187.1
[58] Field of Search .................. 277/53, 55–57, 277/24, 25, 133, 134, 138, DIG. 4; 308/36.1, 187.1, 187.2

[56] References Cited

U.S. PATENT DOCUMENTS

| | | | |
|---|---|---|---|
| 1,978,739 | 10/1934 | Brittain | 308/187.1 |
| 2,020,002 | 11/1935 | Schweich | 277/133 X |
| 2,385,306 | 9/1945 | Shafer | 277/56 X |
| 3,537,725 | 11/1970 | Frost | 308/187.2 |

FOREIGN PATENT DOCUMENTS

| | | | |
|---|---|---|---|
| 1190218 | 3/1959 | France | 277/133 |
| 690521 | 6/1965 | Italy | 277/56 |
| 367215 | 2/1932 | United Kingdom | 277/133 |

Primary Examiner—Robert S. Ward, Jr.
Attorney, Agent, or Firm—Learman & McCulloch

[57] ABSTRACT

A bearing seal for a conveyor trolley wheel or the like in the form of a labyrinth type seal having a configuration such that water or dirt attempting to pass inwardly through the seal is blocked from the bearing and drained to the exterior of the seal.

11 Claims, 1 Drawing Figure

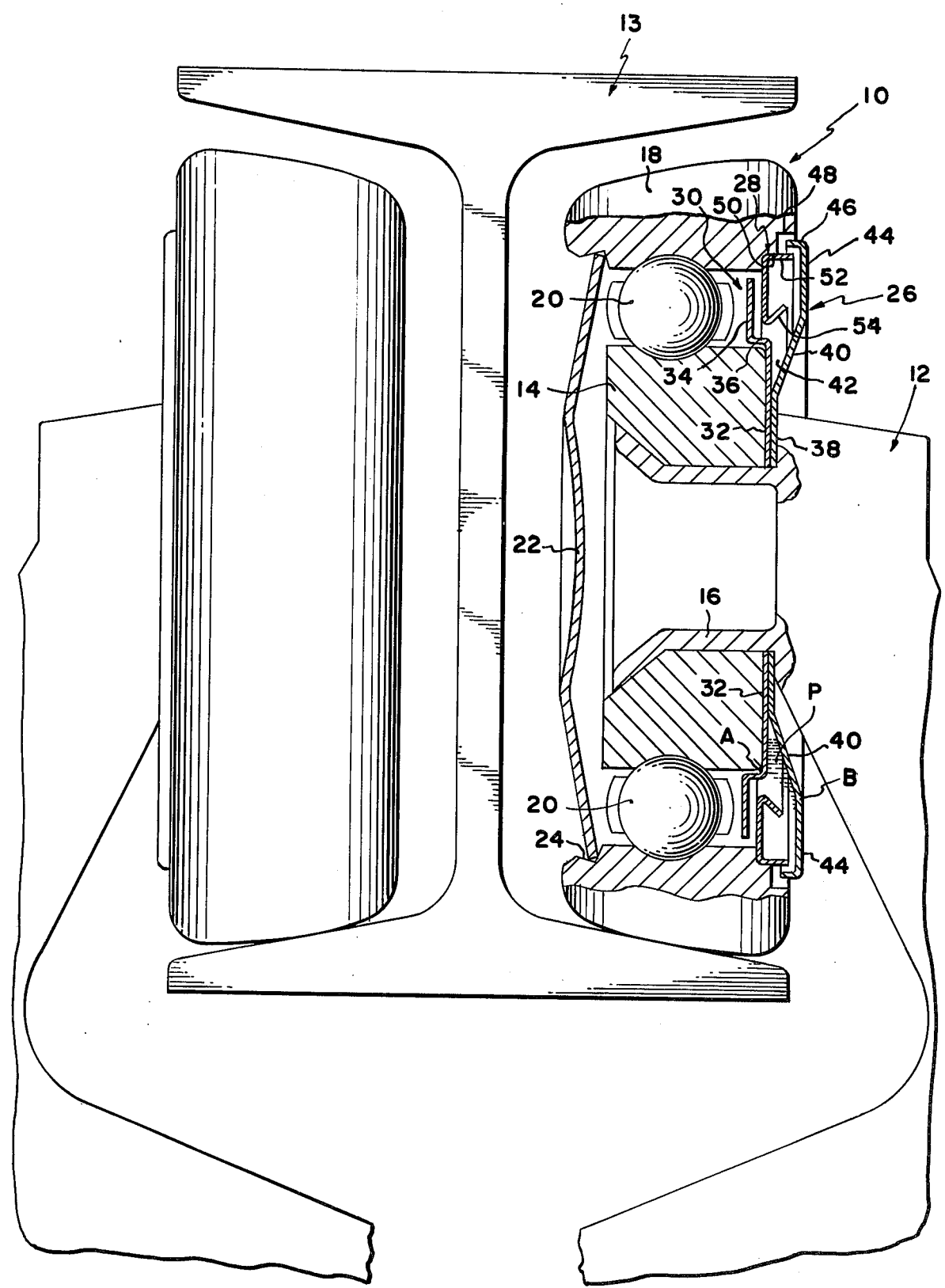

LABYRINTH SEAL FOR TROLLEY WHEELS OR THE LIKE

BACKGROUND OF THE INVENTION

Although useful in other environments, the bearing seal of the patent invention is especially useful on conveyor trolley wheels in environments where a trolley conveyor is employed to convey workpieces through regions, such as steam chambers, where the wheel bearing is exposed to moisture or other foreign matter.

SUMMARY OF THE INVENTION

The seal of the present invention takes the form of a three element labyrinth seal having an annular outer web mounted upon the stationary inner race of the bearing. The outer web projects radially outwardly from the inner race into radially overlapping relationship with the outer race and is formed with an inwardly projecting axial lip at its outer perphery which projects inwardly of a radial shoulder on the rotating outer race. A second annular inner web is also mounted upon the stationary inner race to project substantially across the annular spacing between the inner and outer races of the radial bearing. The outer race carries an annular intermediate web which projects radially inwardly from the outer race into the space between the inner and outer webs on the inner race. An axially projecting lip on the outer periphery of the intermediate web axially overlaps the inwardly projecting web on the annular outer member to form a first labyrinth, the radially inner portions of the intermediate and outer webs are formed with radially and axially outwardly inclined portions. The inner surface of the outer web provides a path by which dirt and moisture are trapped in a stationary pocket which opens at the lower side of the seal to enable particles and moisture to be drained from the interior of the seal.

Other objects and features of the invention will become apparent by reference to the following specification and to the drawing.

IN THE DRAWING

The single FIGURE of the drawing is an end view, partially in section, of a portion of a trolley conveyor employing a seal of the present invention.

DESCRIPTION OF THE INVENTION

In the drawing, the invention is disclosed as applied to the trolley wheels of a more or less conventional trolley conveyor of the general type, for example, disclosed in U.S. Pat. No. 3,537,725 which includes a pair of trolley wheels designated generally 10 mounted upon a bracket assembly 12 to ride on opposite sides of an overhead I-beam rail 13. The trolley wheel 10 includes an inner race 14 which is fixedly mounted upon bracket 12 as by a swaged section 16, inner race 14 thus constituting a stationary member. An outer race or wheel 18 is rotatably supported upon inner race 14 by a plurality of balls 20, in a well known manner. The inner side of each trolley wheel 10 is sealed by a bearing cap 22 which is resiliently sprung and seated in a groove 24 in outer race 18.

A labyrinth seal embodying the present invention includes an annular outer member designated generally 26, an annular intermediate member designated generally 28 and an annular inner member designated generally 30. Outer member 26 and inner member 30 are fixedly mounted upon inner race 14, while intermediate member 28 is fixedly mounted upon outer race 18.

Inner seal member 30 is formed with an annular inner portion 32 which lies in face to face engagement with the outer end surface of inner race 14. An axially offset radially outer portion 34, intergrally connected to inner portion 32 as by a shoulder portion 36, lies within and extends radially substantially across the space between inner race 14 and outer race 18. Outer portion 34 of inner member 30 functions primarily as a grease retainer to maintain lubricant introduced into the bearing through the swaged section 16 in the bearing area.

Outer seal member 26 is formed with a flat radial inner portion 38 which is clamped into face to face engagement with portion 32 of inner member 30. A radially and axially outwardly inclined web portion 40 is formed on outer member 26 to diverge from inner member 30 at a location radially inwardly of the shoulder portion 36 of inner member 30 to form an annular pocket of generally V-shaped cross section as at 42. A second web section 44 lying in a radial general plane extends outwardly from the outer periphery of the inclined web section 40 and terminates at its outer periphery in an axially inwardly extending lip 46. Web section 44 radially overlaps outer race 18 and lip 46 axially overlaps outer race 18, projecting inwardly beyond the outer surface of member 18 into a groove in the end face of outer race 18 formed by a radial shoulder 48.

Intermediate seal member 28 is mounted on outer race 18 and projects inwardly from the outer race into the space between the webs 34 and 44 of inner and outer members 30 and 26. Intermediate member 28 is seated in a groove 50 formed in outer race 18 and includes an axially outwardly extending lip 52 which axially overlaps the stationary lip 46 on outer member 26. At its radially inward periphery, a radially and axially outwardly inclined web 54 is integrally formed on intermediate member 28, axially overlapping the inner axial portion of pocket 42.

It is believed apparent that the arrangement shown in the drawing minimizes the possibility of the entry of moisture or foreign particles into the interior of the wheel assembly through the labyrinth seal. In order to enter, droplets or particles have to pass through a first labyrinth constituted by the axially overlapping shoulder 48, lip 46 and lip 52. Contact with shoulder 48 or lip 52 will normally cause the particles to be impelled, by the centrifugal action of these rotating surfaces, radially outwardly away from the interior of the seal.

Particles which do pass this first labyrinth enter the space between the stationary outer member 26 and the rotating intermediate member 28. At the top half of the assembly, particles traveling downwardly which tend to pass the axially outer side of web 54 of the rotating intermediate member 28, hit the inclined surface of web 40 of the stationary outer member, cling and slide downwardly into pocket 42. The particles then slide downwardly along the pocket to the lower half of the bearing, at which time the solid particles will drop back out of the pocket, and be deflected by lip 54 of intermediate member 28 outwardly against the inner surface of outer member 26 so that they can pass out the labyrinth at the bottom of the assembly.

It is important that the shoulder A at the juncture of webs 32 and 36 of inner seal member 30, is located radially inwardly of the shoulder B between inclined web 40 and web 44 of outer member 26. At the lowermost portion of the seal, liquid which flows down pocket 42 bridges the space between webs 32 and 40. By extending the inclined web 40 so that its inclined inner surface extends radially outwardly (or, at the bottom of the seal, below) the shoulder at A the liquid bridging the opposed surfaces of webs 32 and 40 tends to cling to web 40 to form a sort of pool as indicated at P, the surface tension thus tending to induce flow down the inner surface of outer member in preference to flow axially inwardly along inner member 30. Entering particles which engage rotating intermediate member 52 are normally slung outwardly by centrifugal action to find their way to the bottom of the seal assembly to exit through the labyrinth at the bottom of the rotating wheel.

Water droplets which contact the inner surface of outer member 26 at any point will tend to cling to the surface and pass by gravity to its lowermost point to exit at the bottom of the member. Droplets which strike intermediate member 28 will be centrifugally slung onto the inner surface of outer member 26.

While one embodiment of the invention has been disclosed, it will be apparent to those skilled in the art that the disclosed embodiment may be modified. Therefore, the foregoing description is to be considered exemplary rather than limiting and the true scope of the invention is that defined in the following claims.

We claim:

1. A bearing seal for a rotating trolley wheel or the like having a stationary inner race and a rotatable outer race spaced from said inner race, said seal comprising an annular outer member fixed to said inner race at one axial end thereof and projecting radially outwardly from said inner race beyond the inner periphery of said outer race, an annular intermediate member fixedly mounted on said outer race and projecting radially inwardly from said outer race to an inner periphery spaced radially outwardly from said inner race and axially inwardly of said outer member, and an annular inner member fixedly mounted on said inner race and projecting radially outwardly therefrom into radially overlapping relationship with said intermediate member at the axially inward side thereof, said outer member having an annular radially and axially outwardly inclined web portion thereon.

2. A seal as defined in claim 1 wherein said outer race has a radially inwardly facing shoulder thereon, and an axially inwardly projecting lip on said outer member spaced radially inwardly from said shoulder and disposed in axially overlapping relationship with said shoulder.

3. The invention as defined in claim 2 further comprising an axially outwardly projecting lip on said intermediate member located radially inwardly of said shoulder in spaced opposed relationship therewith cooperating with said shoulder to define an annular axially outwardly facing recess, said lip on said outer member projecting into said recess.

4. The invention defined in claim 1 further comprising an annular radially and axially outwardly inclined web on the radially inner portion of said intermediate member.

5. The invention defined in claim 1 wherein said inner and outer members have radially extending inner portions disposed in face-to-face engagement with each other, said annular web portion of said outer member diverging from said inner member to define therewith an annular pocket on the stationary inner race.

6. The invention defined in claim 1 wherein said inner member includes a radially extending web section terminating at its outer periphery at an axially inwardly directed shoulder, said web portion of said outer member diverging from said web section to a radially outer periphery located radially outwardly of said shoulder on said inner member.

7. The invention defined in claim 5 wherein said inclined web on said intermediate member extends in axially overlapping spaced relationship to the radially inner side of said pocket to deflect material falling from the bottom of said pocket to the axially outer side of said intermediate member.

8. A bearing seal for a rotating trolley wheel or the like having a stationary inner race and a rotatable outer race spaced from said inner race, said seal comprising an annular outer member fixed to said inner race at one axial end thereof and projecting radially outwardly from said inner race beyond the inner periphery of said outer race, an annular intermediate member fixedly mounted on said outer race and projecting radially inwardly from said outer race to an inner periphery spaced radially outwardly from said inner race and axially inwardly of said outer member, and an annular inner member fixedly mounted on said inner race and projecting radially outwardly therefrom into radially overlapping relationship with said intermediate member at the axially inward side thereof, said intermediate member having an annular axially inclined deflector surface thereon.

9. The seal defined in claim 7 wherein said surface is a radially and axially outwardly inclined web portion.

10. The seal defined in claim 7 wherein the web portion is a radially inner terminus portion.

11. A seal as defined in claim 7 wherein said outer race has a radially inwardly facing shoulder thereon, and an axially inwardly projecting lip on said outer member spaced radially inwardly from said shoulder and disposed in axially overlapping relationship with said shoulder and an axially outwardly projecting lip on said intermediate member is located radially inwardly of said shoulder in spaced opposed relationship therewith cooperating with said shoulder to define an annular axially outwardly facing recess, said lip on said outer member projecting into said recess, and said terminus portion being radially inwardly of said lip.

* * * * *